Figure 1:
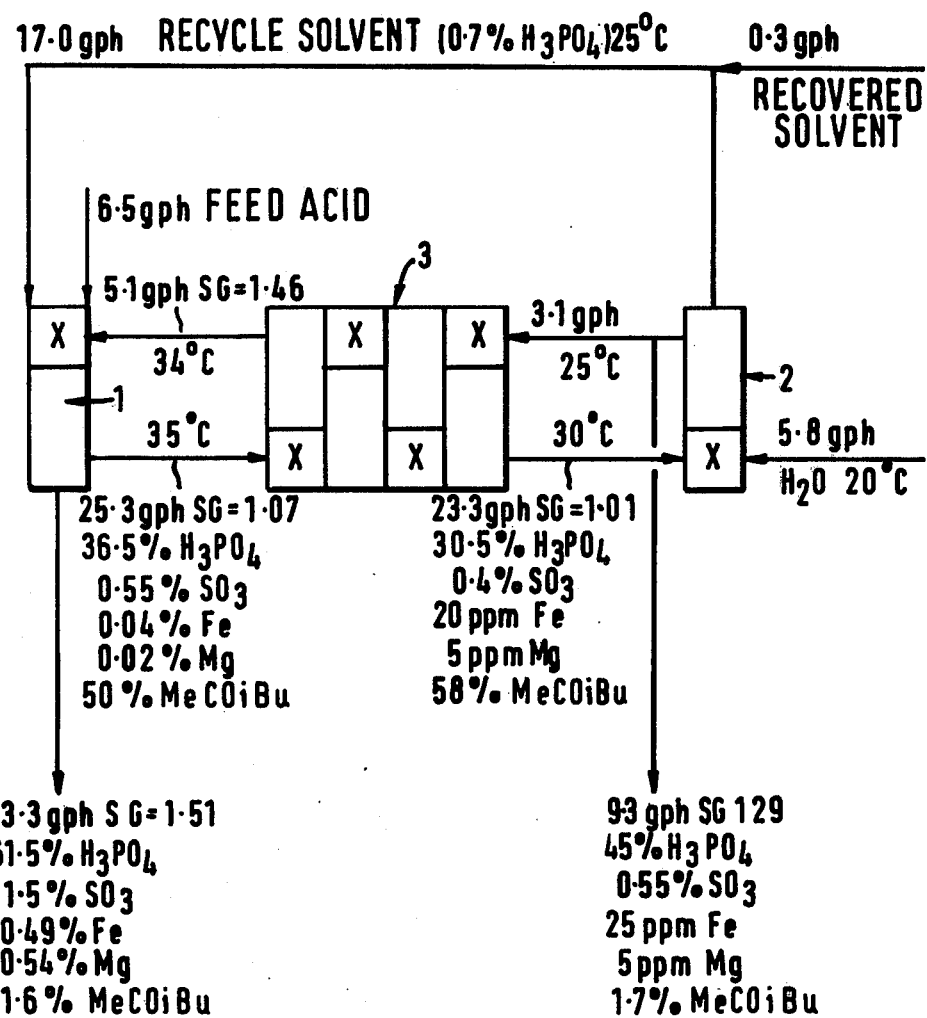

United States Patent [19]

Williams

[11] 4,127,640
[45] * Nov. 28, 1978

[54] PURIFICATION OF PHOSPHORIC ACID BY SOLVENT EXTRACTION USING HEXANONES

[75] Inventor: Thomas A. Williams, Beckermet, England

[73] Assignee: Albright & Wilson Ltd., Warley, England

[*] Notice: The portion of the term of this patent subsequent to Oct. 21, 1992, has been disclaimed.

[21] Appl. No.: 716,371

[22] Filed: Aug. 23, 1976

Related U.S. Application Data

[63] Continuation of Ser. No. 622,486, Oct. 15, 1975, abandoned, which is a continuation of Ser. No. 353,876, Apr. 23, 1973, Pat. No. 3,914,382.

[30] Foreign Application Priority Data

Apr. 26, 1972 [GB] United Kingdom ............... 19476/72

[51] Int. Cl.$^2$ ............................................. C01B 25/16
[52] U.S. Cl. ................................. 423/321 S; 423/309
[58] Field of Search .................... 423/320, 321 S, 308, 423/309, 307

[56] References Cited

U.S. PATENT DOCUMENTS

| | | | |
|---|---|---|---|
| 1,929,442 | 10/1933 | Milligen | 423/320 |
| 2,885,265 | 5/1959 | Cunningham | 423/321 |
| 3,338,674 | 8/1967 | Baniel | 423/320 |
| 3,367,738 | 2/1968 | Schallert | 423/321 |
| 3,433,592 | 3/1969 | Baniel | 423/321 |
| 3,438,746 | 4/1969 | Cousseians | 423/321 |
| 3,556,739 | 1/1971 | Baniel et al. | 423/321 |
| 3,707,357 | 12/1972 | Chiavej | 423/321 |
| 3,914,382 | 10/1975 | Williams | 423/321 S |

FOREIGN PATENT DOCUMENTS

| | | | |
|---|---|---|---|
| 654,014 | 6/1965 | Belgium | 423/321 |
| 1,142,719 | 2/1969 | United Kingdom | 423/321 |
| 1,209,272 | 10/1970 | United Kingdom | 423/321 |
| 1,240,285 | 7/1971 | United Kingdom | 423/321 |

OTHER PUBLICATIONS

Journal Chem. & Engr. Data–4/68–vol. 13, #2–pp. 194–196.
Salnet Extraction Reviews–1971–vol. 1–pp. 96–100.

Primary Examiner—O. R. Vertiz
Assistant Examiner—Eugene T. Wheelock
Attorney, Agent, or Firm—Flynn & Frishauf

[57] ABSTRACT

Wet process phosphoric acid may be purified by solvent extraction to produce a product of greater purity and concentration than has hitherto been attainable by employing an acyclic hexanone, preferably methyl isobutyl ketone as the solvent. Preferably the extraction of the acid into the ketone and the release into water are carried out in 2 actual or theoretical counter-current stages. Alternatively the release may be carried out into an aqueous solution of a base.

33 Claims, 3 Drawing Figures

PURIFICATION OF PHOSPHORIC ACID BY SOLVENT EXTRACTION USING HEXANONES

This is a continuation, of application Ser. No. 622,486, filed Oct. 15, 1975, now abandoned, which in turn was a continuation of Ser. No. 353,876, filed Apr. 23, 1973, issued as U.S. Pat. No. 3,914,382.

The present invention relates to the purification of phosphoric acid obtained by the wet process by reaction of sulphuric acid with phosphate rock. Such acid will hereafter be termed "wet process acid". In particular the present invention relates to purification of such acid by solvent extraction techniques.

Proposals for solvent extraction purification of wet process phosphoric acid date back at least 40 years. Initially the solvents suggested (for example in U.S. Pat. No. 1,968,544) were water-miscible, for example alcohols and acetone, which required distillation in order to release the purified acid; alternatively there were suggested water immiscible short chain alcohols requiring many stages for effecting a satisfactory extraction.

In more recent years attempts to put into practice solvent extraction processes for wet process phosphoric acid have been made. However, these have largely been restricted to processes (such as those described in British Patent No. 805,517 using butanol and British Patent No. 954,478 using alkyl phosphates), in which either chloride ions are especially added to the acid or chloride ions are present as a result of using hydrochloric acid instead of sulphuric acid in the production of the phosphoric acid. The presence of chloride ion promotes a salting out effect which assists in promoting transfer of the phosphoric acid species to the organic phase.

A group of recent proposals is concerned with the use as solvents of certain ethers which extract the phosphoric acid present in aqueous solutions at concentrations above a certain threshold value, quoted as 35% $H_3PO_4$, but do not extract any acid at concentration below the threshold value. The first of these proposals is contained in British Patent No. 1,112,033 which, in addition to the ethers referred to above, also mentions a number of other possibilities including ketones. The method disclosed required a substantial temperature differential between extraction and release of the acid, the former being out at a relatively low temperature and the extract being heated, with or without the addition of a little water, to effect release of the acid. British Patent No. 1,240,285, which is a patent of addition to British Patent No. 1,112,033 describes the same process but using a mixture of solvents, one such mixture being an ether and a ketone, of which cyclohexanone is specifically mentioned. The third proposal in the group concerned with solvents having a threshold value quoted as 35% is U.S. Pat. No. 3,556,739 which describes the use of a wide range of aliphatic esters, aliphatic and cycloaliphatic ketones and glycol ethers. While the specific description is directed only to the same type of process as that of British Patent No. 1,112,033 in which the extracted is heated in order to release the acid, reference is also made to the possibility of effecting release of the acid by an isothermal route involving one stage contact of the solvent with water. However, no information is given as to which of the many solvents referred to in connection with the temperature — raising process may be employed or as to the temperatures appropriate to it.

A process has also been described in British Patent No. 1,063,248 for removing nitric acid from the aqueous phosphoric nitric acid mixture obtained by decomposing phosphate rock with nitric acid. In this process a ketone is used to extract the nitric acid, leaving the phosphoric acid in its impure form in the aqueous phase. Such acid could only be used for fertiliser production.

So far as I am aware none of the above processes is a successful commercial operation.

It is an object of this invention to provide a commercially operable solvent extraction process for increasing the purity of wet process phosphoric acid derived from the action of sulphuric acid on phosphate rock.

It is a further object of the invention to provide a process which can be employed direct to the most widely available commercial grade of wet process phosphoric acid to the so-called "merchant grade" wet process phosphoric acid having an acidity in the range 74–79%.

A yet further object of the invention is to provide a purified wet process phosphoric acid of a high concentration of $H_3PO_4$ species, of up to 56% $H_3PO_4$, as compared to most proposals in the prior art.

I have found that these objects may be fulfilled if one employs as the extracting solvent, an acyclic hexanone.

Accordingly, the present invention provides a process for the purification of wet process phosphoric acid which comprises contacting the said wet process phosphoric acid with an acyclic hexanone and subsequently contacting the hexanone into which at least some of the $H_3PO_4$ content of the wet process acid has been extracted with water or aqueous solution of a base to liberate aqueous phosphoric acid of increased purity having regard to the initial wet process phosphoric acid feed.

"Acyclic hexanone" will be employed herein to denote unsubstituted acyclic ketones of 6 carbon atoms containing 2 saturated alkyl groups.

Although other acyclic hexanones such as methyl n-butyl ketone and ethyl propyl ketone may be employed the preferred hexanone is methyl isobutyl ketone. This is contrary to expectation, since this ketone is known to be useful for extracting from acids for analytical purposes the very metal impurities which are to be removed in the aqueous raffinate in the solvent extraction process. I have found, however, that methyl isobutyl ketone has the advantage of at temperatures in the range 25°–50° C, being capable of extracting substantially all of the $H_3PO_4$ values from an acid of an acidity in the range 70–85%. Ketones of higher molecular weight required a higher concentration of phosphoric acid in the feed before they will extract substantially all the $H_3PO_4$ and it would therefore be necessary to institute a further concentration stage of the acid prior to using such a ketone to obtain satisfactory results. Methyl isobutyl ketone further has the advantage of having a higher flash point as compared to ketones of lower molecular weight but forming an azeotrope having a boiling point sufficiently low to enable easy solvent recovery by distillation. Furthermore methyl isobutyl ketone has low solubility (of the order of 1–2%) in aqueous $H_3PO_4$ thus permitting a product of the release stage having only a low solvent content which may be removed with comparative ease as compared to other ketones as a result of the composition and boiling point of the azeotrope formed. It further permits the production of an aqueous raffinate having a $H_3PO_4$ content in the range 55–65% which is suitable for use directly in fertiliser production, unlike the raffinate produced by using ketones of lower molecular weight. The fact that methyl isobutyl ketone at temperatures at which it is normally desirable to work (i.e. in the range 25°-50° C, at which the system has a suitable viscosity) extracts substantially all the $H_3PO_4$ from normal merchant grade phosphoric acid would normally require that a little water be added in order to produce a handleable aqueous raffinate. This may be accomplished either by adding water with or to the feed or more preferably by feeding aqueous phosphoric acid which has been employed in a scrubbing operation to reduce the impurity content of the extract into the initial stage where wet process acid is contacted with the ketones.

Phosphoric acid for purification according to the invention is obtained by filtration or other separation of calcium sulphate from the slurry obtained by the attack of sulphuric acid on phosphate rock. In such a state it contains a wide range of impurities, some of which such as fluorine and sulphate ions and dissolved organic material may if desired by removed from the acid prior to the solvent extraction of the present invention, other impurities such as iron, chromium, magnesium and other metallic cations, however, are not removable by such a pre-treatment.

Conventionally the acid from the attack stage is cooled as much as possible in order to induce post precipitation of the impurities present. The acid will normally be cooled to about 25° – 30° C.

The temperature at which the solvent extraction is optimally carried out may vary according to the acidity of the wet process acid fee. However, we have found that a temperature below 50° C. e.g. temperature of 25° – 50° C is normally convenient for all concentrations of acid and that one of 35° – 40° C for methyl isobutyl ketone is particularly useful for acids having an acidity in the range of 65 – 85%. The process may be carried out with the release of the phosphoric acid from the extract into an aqueous phase being accomplished without raising the temperature.

The acid to be employed in the present process will either be obtained from the attack stage at the required concentration, or will be concentrated up to this level (i.e. of an acidity of 65% as above) before purification. Thus, for example, when methyl isobutyl ketone is employed it is common to employ an acid of an acidity in the range 74 – 79% e.g. of concentration 75%, $H_3PO_4$ and 4% $H_2SO_4$ (i.e. about 79% acidity).

The acidity of the acid is herein defined as the total weight % of $H_3PO_4$ and $H_2SO_4$ specied present therein, this simple addition being possible as a result of $H_3PO_4$ and $H_2SO_4$ both having a molecular weight of 98. Thus an acid having an $H_3PO_4$ content of 74% and an $H_2SO_4$ content of 5% would have an acidity of 79%.

Wet process acid of the required acidity is contacted with the acyclic hexanone in a weight ratio of hexanone to aqueous wet process phosphoric acid feed of at least 0.3:1 preferably in the range 0.5 to 2.0 : 1 more preferably in the range 1.0 to 1.5 : 1 optimally 1.2 to 1.4 : 1 for a one stage extraction. If, as is often preferred for reasons which will be explained later, a multistage extraction is employed it will be preferred to employ slightly more hexanone in the range 1.3 to 1.5 : 1. The use of a ratio greater than 2.0 : 1 may be employed if desired, however no benefit is obtained and a larger plant will be required.

Figure 2:
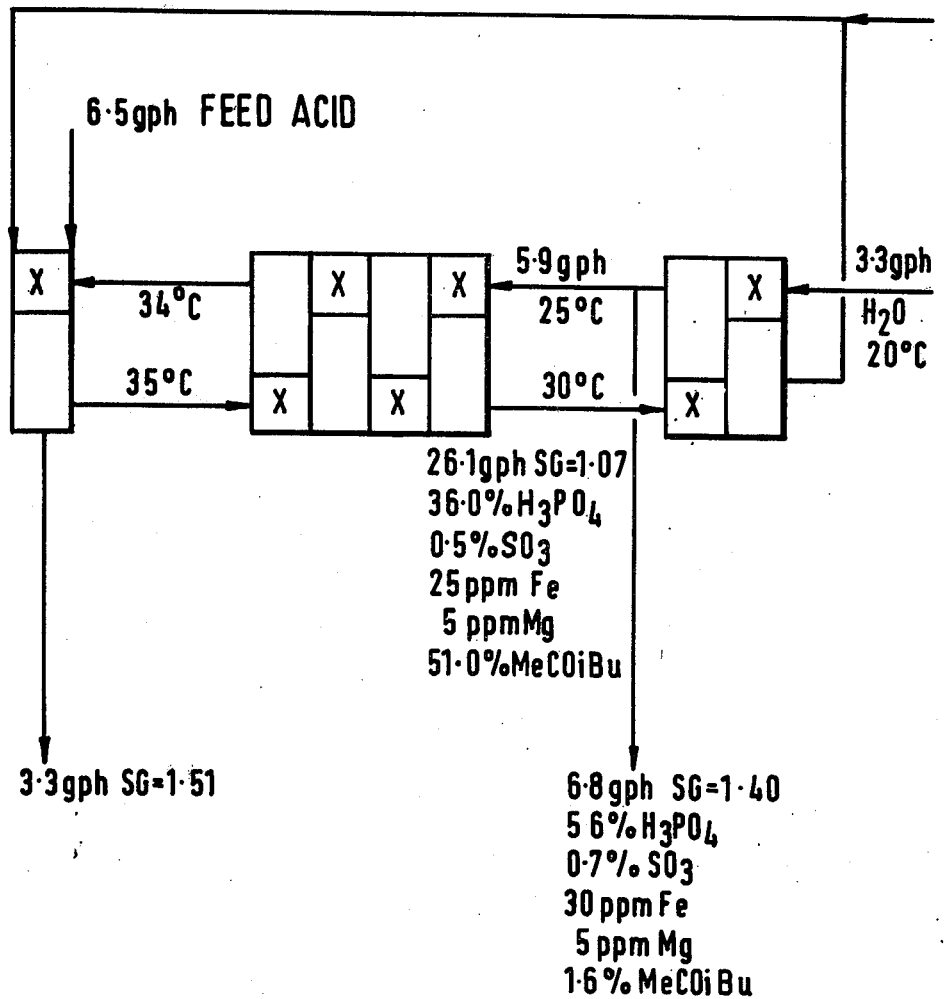
Figure 3:
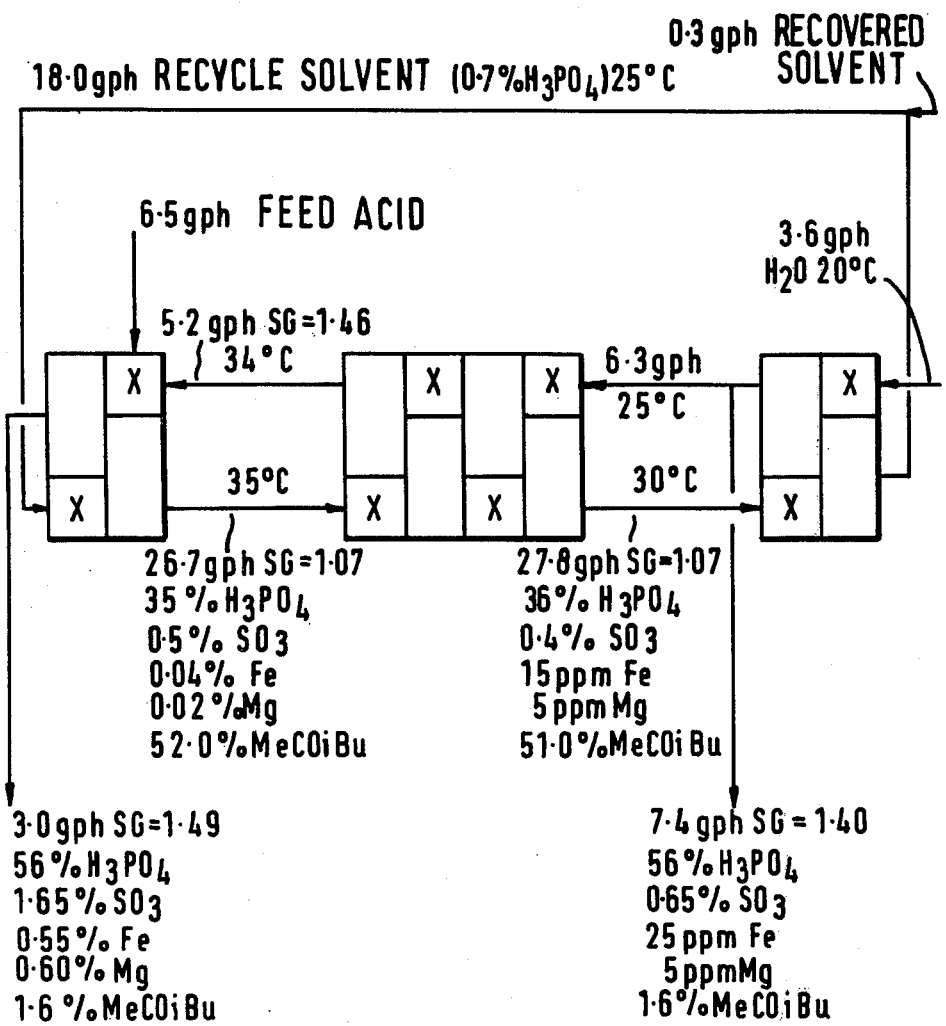

The invention is briefly illustrated in the drawings (FIGS. 1-3). FIG. 1 is a flow diagram of one embodiment of the process of the invention. FIGS. 2 and 3 are flow diagrams of embodiments of the invention which are modified from the embodiment depicted in FIG. 1.

It is often desirable to employ a multistage extraction process. We have found that a greater concentration of $H_3PO_4$ in the raffinate for a given impurity occurs for a one stage extraction than for a two or more stage extraction. Thus less $H_3PO_4$ is lost in the raffinate if the extraction is carried out in two or more stages. A two stage extraction is conveniently accomplished by introducing the feed acid into one mixer section of a two stage counter-current mixer settler unit and the hexanone into the other mixer section. If a scrubbing stage is employed the recycled scrub liquor is fed into the same mixer section as the feed acid.

As an alternative to using mixer-settler units packed columns in which the hexanone and feed acid are fed counter-current may be employed or other continuous extractors, such as sieved plate extractors, rotating disc extractors and pulsed columns may be used.

If a phosphoric acid of high purity is required, the extract containing the acid is then scrubbed by repeatedly contacting it with a small amount preferably of an aqueous solution of phosphoric acid of a high degree of purity in order to extract the cationic impurities into the aqueous phosphoric acid phase. Alternatively water can be used which re-extracts some $H_3PO_4$ in the first contact and may then be contacted with further impure extract in contact with which it acts as a phosphoric acid scrubbing liquor. The acid used for scrubbing should have an impurity content sufficiently low to enable it to extract impurities from the ketone extract. It should have an $H_3PO_4$ content of less than 56% in order to avoid transfer of $H_3PO_4$ from the scrub liquor to the extract. It may either be acid obtained by the thermal process or by a wet process but has an impurity content sufficiently low to enable it to extract impurities from the extract. The amount of phosphoric acid used or produced by the partial extraction of $H_3PO_4$ into water as the liquor to scrub the organic extract will normally be at least in amount of 10% of the amount of $H_3PO_4$ extracted into the organic phase. Preferably it is in the range 30-50%. That is to say the weight ratio of scrubbing liquor to extract is normally from 0.25 to 0.5 : 1 with an acid which has an $H_3PO_4$ content of about 56% such as is obtained when using a hexanone.

After scrubbing if this stage is employed the phosphoric acid is released from the organic phase by contacting it with water or an aqueous solution of a base. This may be accomplished in one stage if desired and if an aqueous base is employed normally is. However, more commonly a multistage release, normally using 2 stages is employed if water is used as the release medium. Suitable apparatus includes mixer-settlers, packed columns etc. as previously described. The amount of water employed should be such that substantially all of the phosphoric acid passes into the aqueous phase from the organic. Desirably no more than 3%, preferably no more than 1% of the $H_3PO_4$ values will be retained in the organic phase. The $H_3PO_4$ content of the aqueous phosphoric acid obtained using water in a one stage release operation will be in the range 44 – 48%, $H_3PO_4$ depending upon the temperature employed, for example using water introduced at a temperature of 20° C an aqueous acid of $H_3PO_4$ content 45% may be obtained in one stage. Using a counter current multistage extractor higher concentrations for example 55 – 59% may be obtained for example 56% using water at 20° C. If desired water at other temperatures, for example condensates obtained from a heatexchanger used for vacuum evaporations may be employed. Typically temperatures in the range 20° to 40° C will normally pertain as a result of the heat absorbed in the release. For a 2 stage release the water may be introduced to one mixer section of a 2 stage water current mixer-settler unit and the extract to the other mixer section. Other techniques enabling 2 theoretical stages to be attained may however be employed if desired. When employing methyl isobutyl ketone as the solvent, the amount of water employed for satisfactory stage release is normally in the range 0.2 to 0.4 : 1 based on the weight of extract, whereas for 2 actual or theoretical stage release an amount of water in the range 0.1 to 0.3 may be employed. If desired a more dilute acid may be obtained by using a greater quantity of water. As mentioned above instead of employing simply water for the release, it is also possible to employ an aqueous solution of a base. Suitable bases include caustic soda, caustic potash, ammonium hydroxide, water soluble amines and basic phosphates such as those of the formula $H_2HPO_4$ where H is a suitable cation to render the material basic and water soluble. The amount of base present may conveniently be up to the amount required to neutralise all the $H_3PO_4$ to the dibasic form, (e.g. M $H_2PO_4$), although lesser amounts of base may be employed if sufficient water is present to extract the remaining $H_3PO_4$ values from the hexanone. Normally a one stage release is sufficient if an aqueous solution of base is employed.

The final product obtained may also contain some of the ketone solvent employed.

This can be released for example by distillation if desired. The process of the invention therefore produces two streams of phosphoric acid, a pure one obtained via the solvent which contains approximately 50 – 70% of the $H_3PO_4$ present in the starting material and having a total metallic content less than 100 ppm relative to $H_3PO_4$ and a less pure one containing phosphate not extracted into the organic phase which is suitable for use in fertilizer production. Alternatively a less well purified stream containing e.g. 95% of the $H_3PO_4$ content may be obtained by using a high concentration of feed acid and little or no scrubbing.

The process of the invention is illustrated by the following examples: In each example the feed acid had the following composition:

EXAMPLE 1

S.G. 1.66
$H_3PO_4$ 77.4%
$H_2SO_4$ 1.6%
Fe 0.23%
Mg 0.25%.

Is herein described with reference to the flow diagram FIG. 1. This illustrates a process in which both the initial extraction of the $H_3PO_4$ into methyl isobutyl ketone and the final release into water are accomplished using one stage mixer settlers (1 and 2 respectively in the figure). The solvent extract is separated from the aqueous raffinate and scrubbed by being passed through a series of mixer settlers, 3, to extract cationic impurities from the solvent extract. The scrub liquor employed is the purified acid obtained from the release mixer settler 2.

The feed acid is introduced to the first mixer settler at a temperature of about 25° C. The temperature rises as a result of the release of heat of extraction of the $H_3PO_4$ into the ketone.

The exact details of the conditions pertaining at each stage of the process are shown on the flow diagram.

The product had an analysis of
$H_3PO_4$ 45%
$H_2SO_4$; 0.65%
Fe; 25 ppm
Al <5 ppm
Mg <5 ppm
Ca <5 ppm
Na 1 ppm
V 2 ppm
Cr <2 ppm
Cu <2 ppm
Ni <1 ppm
Pb <1 ppm
Cd <1 ppm Example 2 is illustrated by FIG. 2.

In this example the 1 stage mixer settler employed for the release of the $H_3PO_4$ from the ketone phase into the water was replaced by a 2 stage opposition. The temperature of the feed acid was again 25° C. The exact conditions pertaining at different stages and the compositions of the streams are shown on FIG. 2.

Example 3 is illustrated by FIG. 3. In this example 2 stage mixer settlers are employed both for the extraction of the $H_3PO_4$ into the ketone and for the release of $H_3PO_4$ into water. Figures for the conditions pertaining at various points and the compositions of the various streams are shown on the figure.

We claim:

1. A solvent extraction process for purifying impure wet process phosphoric acid obtained by action of sulphuric acid on phosphate rock comprising the following steps
   (a) contacting said impure wet process phosphoric acid with an unsubstituted acyclic hexanone containing 2 saturated alkyl groups to form an organic phase of said hexanone and extracted phosphoric acid, and an aqueous phase raffinate, said wet process phosphoric acid being an impure aqueous phosphoric acid having an acid content in the range of 70 – 85%, said acid content being the weight percentage of phosphoric and sulphuric acids contained therein, the weight ratio of said hexanone to said aqueous impure phosphoric acid being from 0.5 : 1 to 2.1;
   separating said organic phase from said aqueous phase raffinate;
   (c) releasing the phosphoric acid from said organic phase by contacting the organic phase with release water in at least one stage to form an aqueous phase containing purified phosphoric acid, and an organic hexanone phase, the weight ratio of said release water to said organic phase being in the range of 0.2 : 1 to 0.4 : 1 based on the weight of said organic phase;
   (d) separating said aqueous phase from said hexanone; and
   (e) recycling said hexanone to step (a).

2. The process of claim 1 wherein said organic phase is contacted with release water in only one stage to form said aqueous phase containing purified phosphoric acid.

3. The process of claim 2 wherein said wet process phosphoric acid is contacted with said hexanone at a temperature below 50° C, the weight ratio of hexanone to said aqueous impure phosphoric acid being from 1 : 1 to 1.5 : 1.

4. The process of claim 3 wherein said impure wet process phosphoric acid is contacted with said hexanone in two countercurrent stages at a temperature between 25° C and 50° C.

5. The process of claim 4 wherein the phosphoric acid is released from said organic phase at a temperature in the range 20° – 40° C.

6. The process of claim 2 wherein said organic phase separated from said aqueous phase raffinate is scrubbed by contacting said organic phase with an aqueous phosphoric acid scrub solution having a phosphoric acid content of less than 56%, said scrub solution containing phosphoric acid in an amount of 10%–50% of the amount of phosphoric acid in said organic phase being scrubbed.

7. The process of claim 6 wherein said aqueous phosphoric acid scrub solution is formed by contacting water with said organic phase containing extracted phosphoric acid to re-extract phosphoric acid, thereby forming said scrub solution.

8. The process of claim 3 wherein said impure phosphoric acid has an acid content in the range 74 – 79%.

9. The process of claim 1 wherein said impure wet process phosphoric acid contacts said hexanone in one stage.

10. The process of claim 3 wherein said hexanone is methyl isobutyl ketone.

11. The process of claim 5 wherein said hexanone is methyl isobutyl ketone.

12. The process of claim 7 wherein said hexanone is methyl isobutyl ketone.

13. The process of claim 1 wherein the release of the phosphoric acid into the aqueous phase is accomplished without raising the temperature.

14. The process of claim 6 wherein said aqueous phosphoric acid scrub solution after having scrubbed said organic phase is fed to step (a).

15. A solvent extraction process for purifying impure wet process phosphoric acid obtained by action of sulphuric acid on phosphate rock comprising the following steps
(a) contacting said impure wet process phosphoric acid with an unsubstituted acyclic hexanone containing 2 saturated alkyl groups to form an organic phase of said hexanone and extracted phosphoric acid, and an aqueous phase raffinate, said wet process phosphoric acid being an impure aqueous phosphoric acid having an acid content in the range of 70 – 85%, said acid content being the weight percentage of phosphoric and sulphuric acids contained herein, the weight ratio of said hexanone to said aqueous impure phosphoric acid being from 0.5 : 1 to 2.1,
(b) separating said organic phase from said aqueous phase raffinate,
(c) releasing the phosphoric acid from said organic phase by contacting the organic phase with release water in a multistage release comprising at least two stages to form aqueous purified phosphoric acid, and an organic hexanone phase, the weight ratio of said release water to said organic phase being in the range of 0.1 : 1 to 0.3 : 1 based on the weight of said organic phase,
(d) separating said aqueous phosphoric acid from said hexanone and,
(e) recycling said hexanone to step (a).

16. The process of claim 15 wherein said wet process phosphoric acid is contacted with said hexanone at a temperature below 50° C, and the weight ratio of said hexanone to said aqueous impure phosphoric acid being from 1 : 1 to 1.5 : 1.

17. The process of claim 16 wherein said impure wet process phosphoric acid is contacted with said hexanone in two counter current stages at a temperature between 25° C and 50° C.

18. The process of claim 17 wherein the phosphoric acid is released from said organic phase at a temperature in the range 20° – 40° C.

19. The process of claim 15 wherein said organic phase separated from aqueous phase raffinate is scrubbed by contacting said organic phase with an aqueous phosphoric acid scrub solution having a phosphoric acid content of less than 56%, said scrub solution containing phosphoric acid in an amount of 10%–50% of the amount of phosphoric acid in said organic phase being scrubbed.

20. The process of claim 19 wherein said aqueous phosphoric acid scrub solution is formed by contacting water with said organic phase containing extracted phosphoric acid to re-extract phosphoric acid, thereby forming said scrub solution.

21. The process of claim 16 wherein said impure phosphoric acid has an acid content in the range 74 – 79%.

22. The process of claim 15 wherein said organic phase is contacted with release water in at least two counter current stages.

23. The process of claim 16 wherein said organic phase is contacted with release water in at least two counter current stages.

24. The process of claim 17 wherein said organic phase is contacted with release water in at least two counter current stages.

25. The process of claim 21 wherein the scrubbed organic phase is contacted with release water in at least two counter current stages.

26. The process of claim 20 wherein said aqueous phosphoric acid scrub solution is a portion of said aqueous phase containing purified phosphoric acid obtained in step (c).

27. The process of claim 15 wherein the release of the phosphoric acid in the aqueous phase is accomplished without raising the temperature.

28. The process of claim 15 wherein said multistage release comprises contacting said organic phase with release water in two countercurrent stages.

29. The process of claim 15 wherein said multistage release terminates with two countercurrent stages.

30. The process of claim 19 wherein said aqueous phosphoric acid scrub solution after having scrubbed said organic phase is fed to step (a).

31. A solvent extraction process for obtaining purified neutralized phosphoric acid from impure wet process phosphoric acid obtained by action of sulphuric acid on phosphate rock comprising the following steps
(a) contacting said impure wet process phosphoric acid with an unsubstituted acyclic hexanone containing 2 saturated alkyl groups to form an organic phase of said hexanone and extracted phosphoric acid, and an aqueous phase raffinate, said wet process phosphoric acid being an impure aqueous phosphoric acid having an acid content in the range of 70–85%, said acid content being the weight percentage of phosphoric acid and sulphuric acids contained therein, the weight ratio of said hexanone to said aqueous impure phosphoric acid being from 0.5 : 1 to 2.1;
(b) separating said organic phase from said aqueous phase raffinate;
(c) releasing the phosphoric acid from said organic phase by contacting the organic phase with an aqueous solution of a base to form an aqueous phase containing purified neutralized phosphoric acid, and an organic hexanone phase;
(d) separating said aqueous phase from said hexanone; and
(e) recycling said hexanone to step (a).

32. The process of claim 31 wherein said aqueous solution of a base is contacted with the organic phase containing phosphoric acid in only one stage to form said aqueous phase containing purified neutralized phosphoric acid.

33. The process of claim 31 wherein said hexanone is methyl isobutyl ketone.

* * * * *